(12) United States Patent
Noh et al.

(10) Patent No.: US 8,107,146 B2
(45) Date of Patent: Jan. 31, 2012

(54) THREE-DIMENSIONAL SPACE SCANNER

(75) Inventors: Jung Eun Noh, Gyunggi-do (KR); Hong Ki Kim, Gyunggi-do (KR); Sang Youl Jeon, Gyunggi-do (KR); Back Kue Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 479 days.

(21) Appl. No.: 12/423,556

(22) Filed: Apr. 14, 2009

(65) Prior Publication Data

US 2010/0118364 A1   May 13, 2010

(30) Foreign Application Priority Data

Nov. 11, 2008   (KR) .................. 10-2008-0111891

(51) Int. Cl.
*G02B 26/08* (2006.01)

(52) U.S. Cl. ............... 359/198.1; 359/221.2; 359/221.3
(58) Field of Classification Search ..... 359/196.1–226.2
See application file for complete search history.

(56) References Cited

U.S. PATENT DOCUMENTS

2005/0195459 A1 * 9/2005 Hoffman et al. .............. 359/212
2008/0210038 A1   9/2008 Minakuchi

FOREIGN PATENT DOCUMENTS

JP   10-020035   1/1998

* cited by examiner

*Primary Examiner* — James Phan
(74) *Attorney, Agent, or Firm* — McDermott Will & Emery LLP

(57) ABSTRACT

A Three Dimensional (3D) space scanner can obtain spatial data by scanning a mobile object not only in the horizontal direction but also in the vertical direction using a mirror that is driven to rotate as well as to tilt.

9 Claims, 7 Drawing Sheets

THREE-DIMENSIONAL SPACE SCANNER

CROSS-REFERENCE TO RELATED APPLICATIONS

This application claims the priority of Korean Patent Application No. 2008-111891, filed on Nov. 11, 2008, in the Korean Intellectual Property Office, the disclosure of which is incorporated herein by reference.

BACKGROUND OF THE INVENTION

1. Field of the Invention

The present invention relates to a Three Dimensional (3D) space scanner, and more particularly, to a 3D space scanner which can obtain spatial data by scanning a mobile object not only in the horizontal direction but also in the vertical direction using a mirror that is driven to rotate as well as to tilt.

2. Description of the Related Art

An autonomous mobile (walking) device such as a mobile robot senses a surrounding object and measures a distance from the object using a laser beam, supersonic waves or the like in order to locate its position and determine a moving direction.

Laser range finding is known as a most accurate method for measuring the distance to an object, particularly, by sensing a laser beam reflecting from the object and measuring the time taken for the laser beam to travel to the object and back.

A conventional autonomous mobile device adopting such a laser range finding technique scans a surrounding space using laser beams emitted directly along a two-dimensional horizontal plane. Accordingly, the autonomous mobile device can sense surrounding objects and measure distances from the objects only if the objects are located at a specific height corresponding to a laser emitter.

That is, sensible objects are limited to those onto which the laser beams are emitted and to those which are located at the same horizontal plane of the laser emitter. Thus, it is impossible to scan other ranges and distance information on only a specific horizontal plane can be obtained.

However, while consumer demands on autonomous mobile devices capable of performing more accurate drive and more various operations are increasing, the distance information only on a specific horizontal plane cannot sufficiently ensure safety and functionality.

SUMMARY OF THE INVENTION

The present invention has been made to solve the foregoing problems with the prior art, and embodiments of the present invention provide a Three Dimensional (3D) space scanner which can obtain spatial data by scanning a mobile object not only in the horizontal direction but also in the vertical direction using a mirror that is driven to rotate as well as to tilt.

According to an aspect of the invention, the 3D space scanner may include a rotary drive unit transmitting a rotating force from a rotary motor through a vertical rotary shaft; a mirror holder rotated by the rotating force of the rotary drive unit, with a mirror provided on the mirror so as to tilt; a tilt guide unit having a central opening, through which the vertical rotary shaft passes through, and a spiral guide groove formed in an outer circumferential portion; and a tilt drive unit connected to the mirror via a rod and reciprocating along the guide groove in the outer circumferential portion of the tilt guide unit to tilt the mirror.

In an exemplary embodiment of the invention, the rod may be hinged to one end of the mirror, which tilts depending on a distance of vertical movement of the tilt drive unit.

A range of tilting of the mirror may be determined depending on a range of vertical movement of the rod.

The tilt drive unit may include at least one body having a protrusion coupling with the guide groove to move along the guide groove; and the rod having one end connected to the body and the other end hinged to the mirror.

The body may vertically move along a path of the guide groove in the outer circumferential portion of the tilt guide unit while turning around the vertical rotary shaft.

The guide groove of the tilt guide unit may be a single guide groove or a pair of crossing guide grooves, which are joined to each other at an axial end.

The 3D space scanner may further include a frame housing therein the tilt guide unit and the tilt drive unit to protect.

The frame may maintain a predetermined interval from an outer circumference of the tilt guide unit such that the tilt drive unit provided between the frame and the tilt guide unit is supported by the frame to move along the outer circumference of the tilt guide unit.

According to embodiments of the invention, the 3D space scanner can obtain spatial data by scanning a mobile object not only in the horizontal direction but also in the vertical direction using the mirror that is driven to rotate as well as to tilt.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE EXEMPLARY EMBODIMENTS

A Three Dimensional (3D) space scanner of the present invention will now be described more fully hereinafter with reference to the accompanying drawings, in which an exemplary embodiment thereof is shown.

Figure 1:
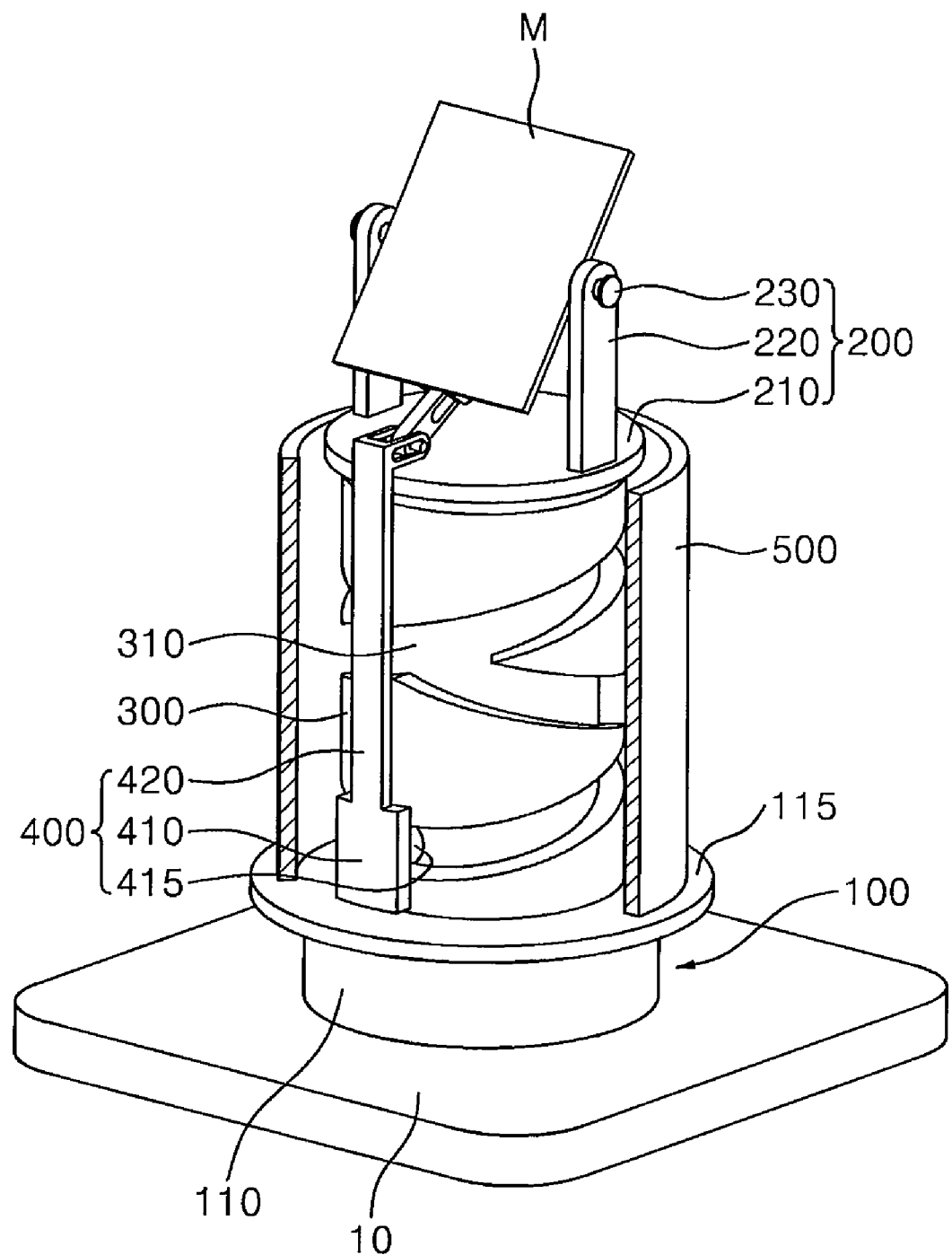
FIG. 1 is a perspective view illustrating 3D space scanner according to an exemplary embodiment of the invention.
Figure 2:
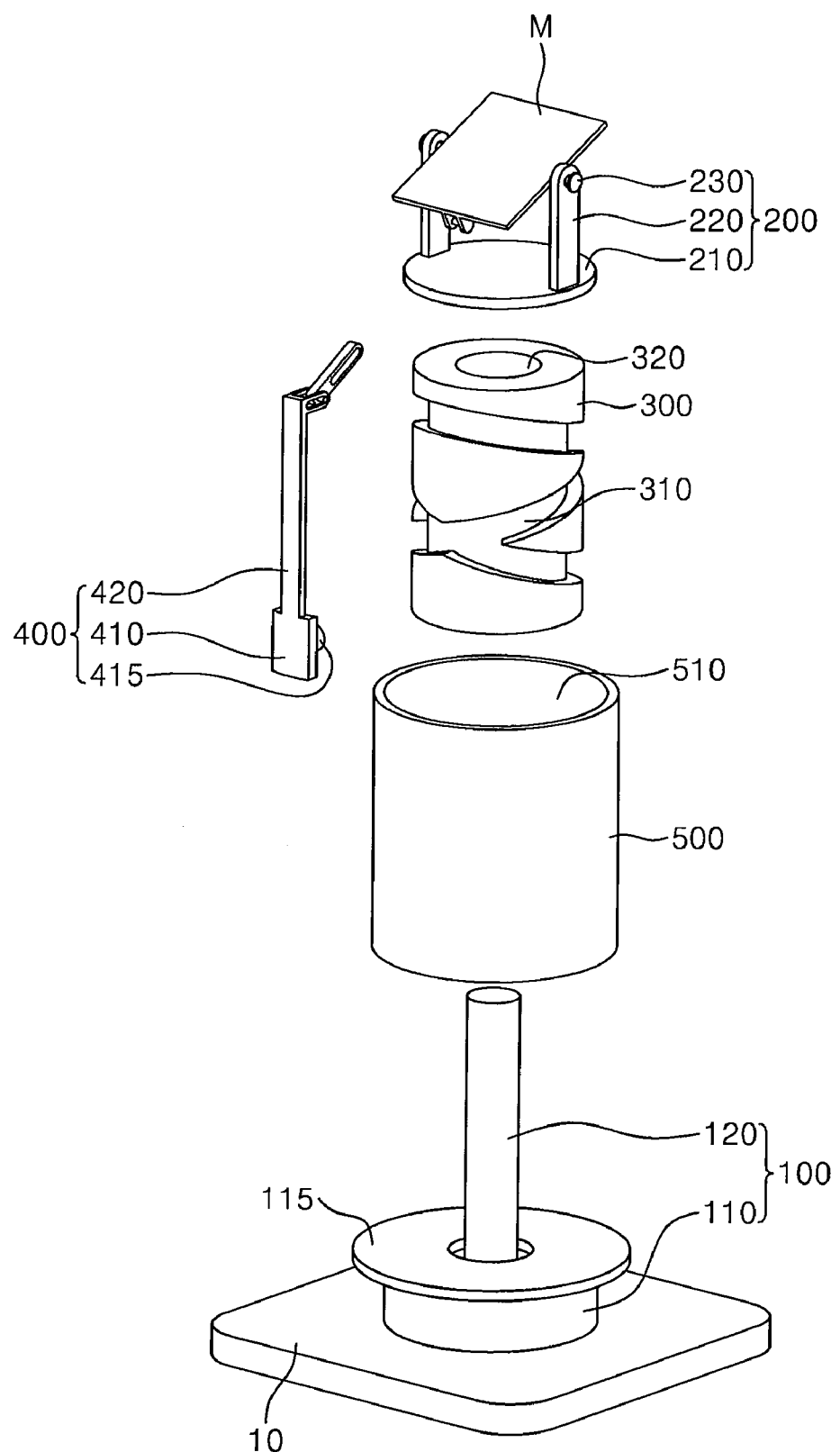
FIG. 2 is an exploded perspective view of the 3D space scanner shown in FIG. 1.

FIG. 1 is a perspective view illustrating a 3D space scanner according to an exemplary embodiment of the invention, and FIG. 2 is an exploded perspective view of the 3D space scanner shown in FIG. 1.

As shown in FIGS. 1 and 2, the 3D space scanner according to one embodiment of the invention includes a rotary drive unit 100, a mirror holder 200, a tilt guide unit 300 and a tilt drive unit 400.

The rotary drive unit 100 is a component generating a rotating force for continuously rotating the mirror M for 360 degrees in the autonomous mobile space scanner of the invention. In the rotary drive unit 100, a rotary motor 110 is provided under a stage 115 to rotate a vertical rotary shaft 120 when a supply voltage is applied thereto.

The rotary motor 110 may be housed inside a case for the purpose of protection.

The vertical rotary shaft 120 is coupled at one end with the rotary motor 110 and at the other end with the mirror holder 200 to transmit the rotating force from the rotary motor 110 to the mirror holder 200.

The rotary drive unit 100 is fixedly provided on top of a base 10. The rotary drive unit 100 may have a shock-absorbing buffer member (not shown) between the rotary drive unit 100 and the base 10.

In the meantime, the mirror holder 200 is a rotary member that is axially connected to the vertical rotary shaft 120 to be rotated in a predetermined direction by the rotating force of the rotary drive unit 100.

As shown in the figures, the mirror holder 200 has an angled U-shaped overall configuration with a horizontal portion 210 and sidewalls 220 extending directly vertically from opposite (right and left) ends of the horizontal portion 210. Substantially the central portion of the horizontal portion 210 is axially connected to the vertical rotary shaft 120.

On top of that mirror holder 200, the mirror M is provided so as to tilt on a horizontal rotary shaft 230 connecting the right and left sidewalls 220.

Specifically, since the mirror M is hinged along the horizontal rotary shaft 230 that connects the opposing sidewalls 220 of the mirror holder 200 while extending across the mirror holder 200, the mirror M can be tilted at a variety of angles without being fixed at a predetermined angle.

The mirror M functions not only to reflect a laser beam emitted from a laser emitter (not shown) to an area around the 3D space scanner but also to receive the laser beam reflecting from an obstacle and the like and reflect the beam again to an optical sensor (not shown).

Thus, the mirror M can rotate together with the mirror holder 200 at a predetermined rate to scan the laser beam at 360 degrees continuously across the areas around the scanner.

In addition, since the mirror M is tilted in a variety of angle ranges without being fixed to an inclination 45 degrees to scan a surrounding space, it is possible to obtain spatial data including not only conventional Two Dimensional (2D) data on a horizontal plane according to a specific height but also a vertical distance.

The tilt guide unit 300 is fixed on the stage 115 of the rotary drive unit 100, and has a central opening 320 through which the vertical rotary shaft 120 can pass.

In addition, a guide groove 310 is recessed in the outer circumference of the tilt guide unit 300 so as to guide the tilt drive unit 400 (which will be described later) to move along the guide groove 310.

The guide groove 310 formed in the outer circumference of the cylindrical body of the tilt guide unit 300 includes a pair of guide grooves such as a left guide groove 311 and a right guide groove 312, which intersect each other. The left and right guide grooves 311 and 312 are joined to each other at opposite axial ends.

In this case, when the tilt drive unit 400 engaged with a first guide groove (e.g., the left guide groove 311) has moved along the guide groove 311 to reach one end, it can move in the opposite direction along a second guide groove (e.g., the right guide groove 312), which is joined to the first guide groove.

As a result, the tilt drive unit 400 can continuously move along a pair of the guide grooves 311 and 312 (310) to vertically reciprocate while the rotary motor 110 of the rotary drive unit 100 continues to rotate in one direction.

Figure 5A:
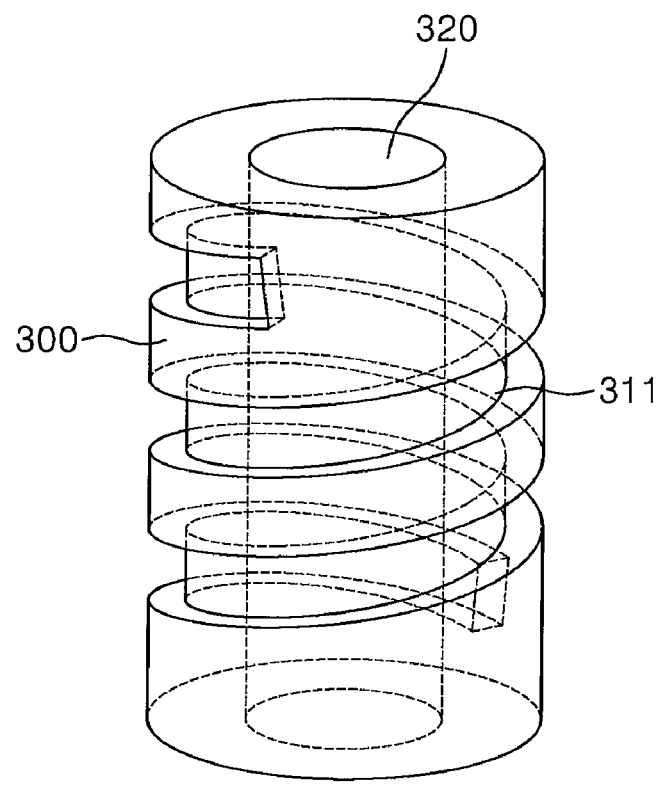
FIG. 5A is an enlarged perspective view illustrating another embodiment of the tilt guide unit in the 3D space scanner shown in FIG. 2.

As an alternative, as shown in FIG. 5A, a single spiral guide groove 310 can be formed in the outer circumference of the tilt guide unit 300.

In this case, the tilt drive unit 400 can move as a nut meshed with a bolt does. Specifically, the tilt drive unit 400 can move in one direction along the guide groove 310 to reach one end, stop at one end of the guide groove 310, and then move again in opposite direction to reach the opposite end of the guide groove 310.

As a result, the tilt drive unit 400 can discontinuously move along the single guide groove 310 to vertically reciprocate, in which the rotary motor 110 of the rotary drive unit 100 periodically changes the direction of rotation.

The tilt drive unit 400 is connected to the mirror M via a rod 420. With such a configuration, the tilt drive unit 400 can vertically reciprocate along the guide groove 310 in the outer circumference of the tilt guide unit 300 to thereby tilt the mirror M.

Figure 3A:
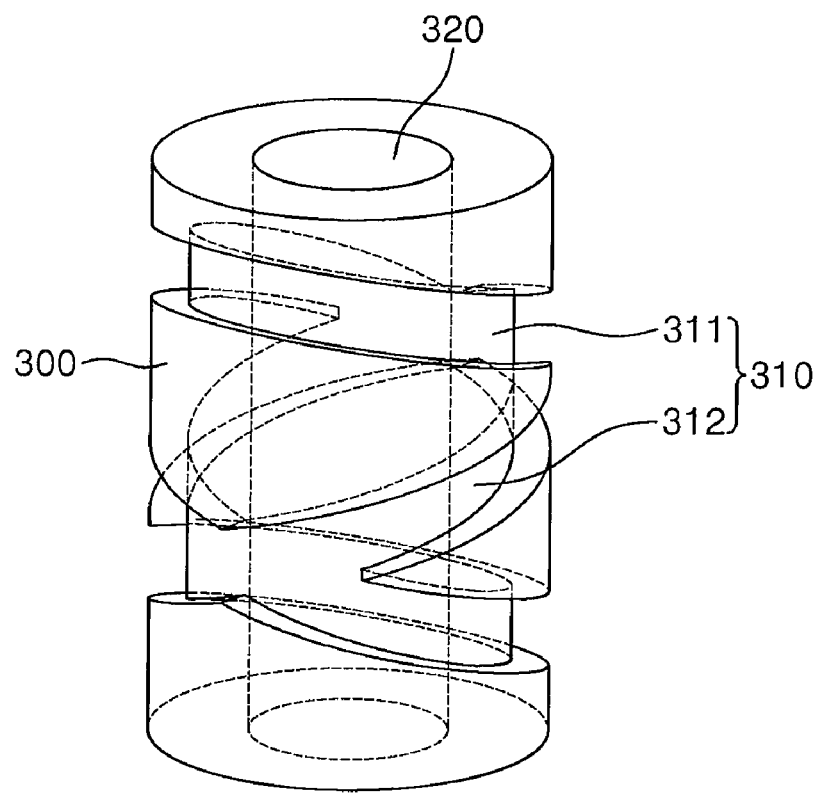
FIG. 3A is an enlarged perspective view illustrating the tilt guide unit in the 3D space scanner shown in FIG. 2.
Figure 3B:
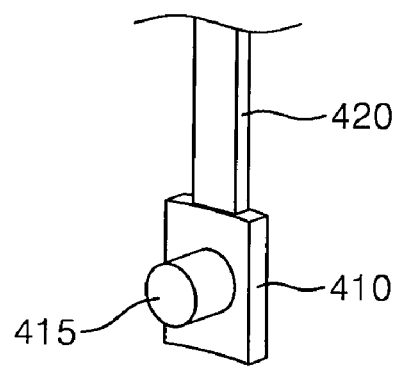
FIG. 3B is an enlarged perspective view illustrating the body of the tilt drive unit in the 3D space scanner shown in FIG. 2.
Figure 5B:
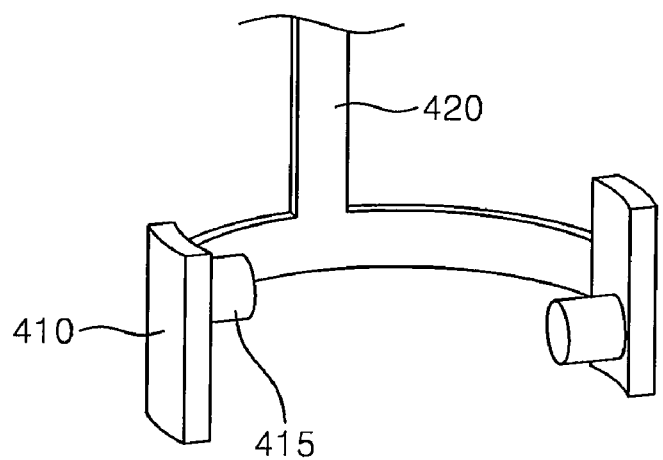
FIG. 5B is an enlarged perspective view illustrating another embodiment of the body of the tilt drive unit in the 3D space scanner shown in FIG. 2.

The tilt drive unit 400 can also include a body 410 and a rod 420 as shown in FIG. 3B, or a pair of bodies 410, which are connected to each other, as shown in FIG. 5B.

The body 410 is configured to conform to the outer circumference of the tilt guide unit 300 having a predetermined curvature, such that it can easily move along the outer circumference of the tilt guide unit 300.

In addition, to move along the guide groove 310, the body 410 has a protrusion 415 coupling with the guide groove 310.

Figure 4:
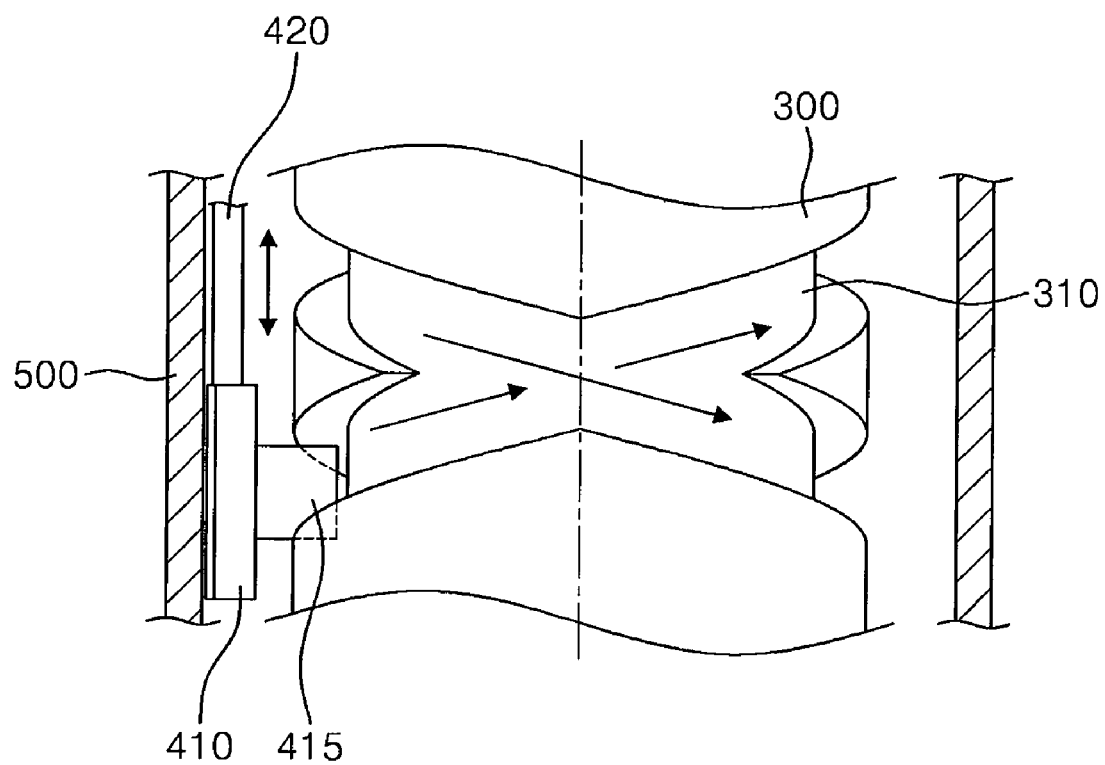
FIG. 4 is a schematic view illustrating the tilt drive unit shown in FIG. 3B moving along the tilt guide unit shown in FIG. 3A.
Figure 6:
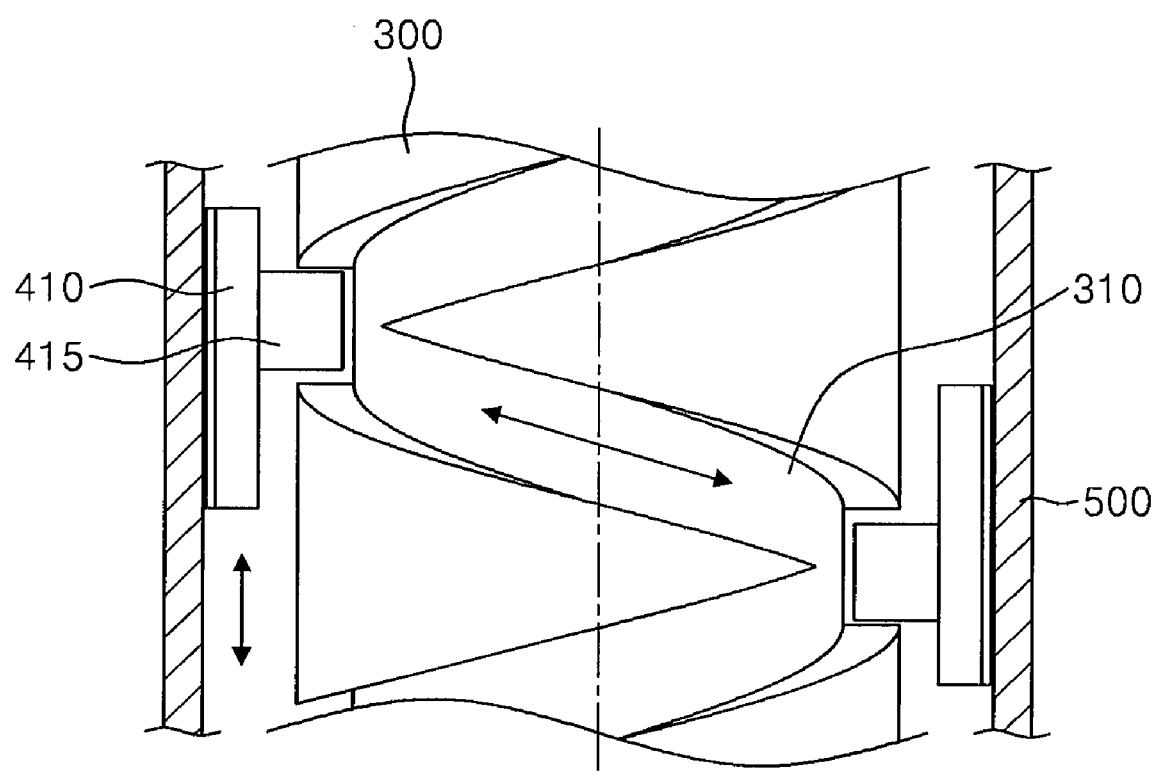
FIG. 6 is a schematic view illustrating the tilt drive unit shown in FIG. 5B moving along the tilt guide unit shown in FIG. 5A.

Specifically, as shown in FIGS. 4 and 6, the body 410 vertically moves along the path of the guide groove 310 in the outer circumference of the tilt guide unit 300 while turning around the vertical rotary shaft 120.

The rod 420 is connected at one end to the body 410 and at the other end hinged to one end of the mirror M to tilt the mirror M depending on the distance of vertical movement of the body 410.

Particularly, the tilting range of the mirror M is determined depending on the range of vertical movement of the rod 420. Thus, the tilting range of the mirror M can be controlled by adjusting the distance of vertical movement of the rod 420.

In the meantime, the 3D space scanner according to this embodiment of the invention also includes a frame 500 surrounding the outside of the tilt drive unit 400 in order to house the tilt drive unit 400 and the tilt guide unit 300 therein for the purpose of protection.

As shown in the figures, the frame 500 is a hollow cylinder member defining therein a hollow space 510 of a predetermined size.

The frame 500 maintains a predetermined interval from the outer circumference of the tilt guide unit 3b0 such that the tilt drive unit 400 provided between the frame 500 and the tilt guide unit 300 is supported by the frame to move along the outer circumference of the tilt guide unit 300.

Here, a bearing (not shown) may be provided between the inner circumference of the frame 500 and the body 410 of the tilt drive unit 400 in order to ensure that the tilt drive unit 400 can smoothly move.

Below, a description will be given of a construction of rotating and tilting the mirror of this embodiment of the invention.

Figure 7A:
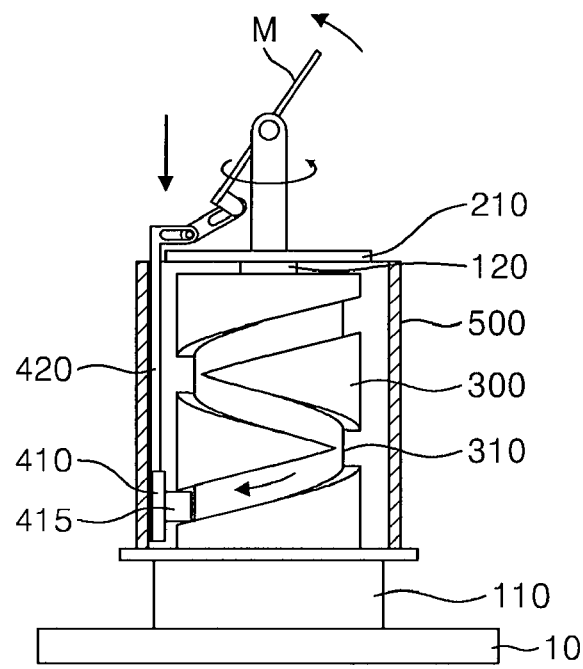
FIGS. 7A and 7B are schematic views illustrating a process of tilting the mirror in the 3D space scanner shown in FIG. 1.
Figure 7B:
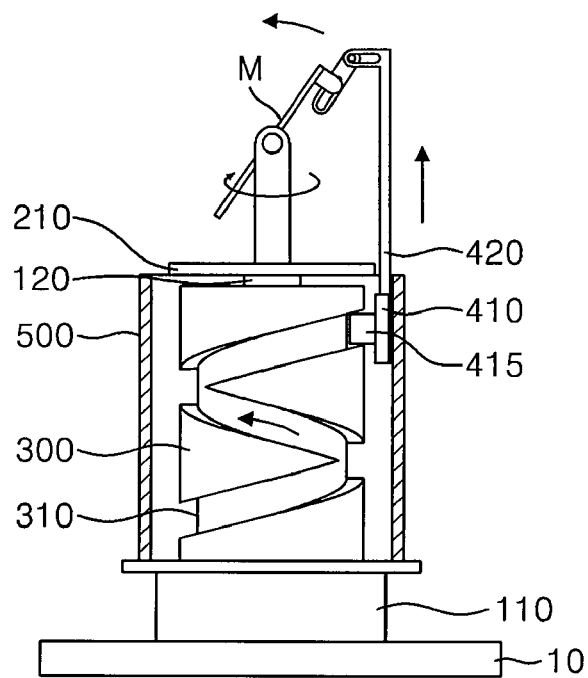

FIGS. 7A and 7B are schematic views illustrating a process of tilting the mirror in the 3D space scanner shown in FIG. 1.

As shown in FIG. 7A, when the mirror holder 200 is rotated together with the vertical rotary shaft 120 by a rotating force from the rotary motor 110, the tilt drive unit 400 connected to the mirror holder 200 moves in the right downward direction along the guide groove 310 to reach the lower end of the guide groove 310.

Then, the mirror M is pulled in the right downward direction by the rod 420 to an inclination θ of 45 degrees or less with respect to the horizon.

In addition, as shown in FIG. 7B, when the mirror holder 200 is rotated together with the rotary shaft 120 by a rotating force from the rotary motor 110, the tilt drive unit 400 connected to the mirror holder 200 moves in the right upward direction along the guide groove 310 to reach the upper end of the guide groove 310.

Then, the mirror M is pushed in the right downward direction by the rod 420 up to an inclination θ of 45 degrees or more with respect to the horizon.

The tilting of the mirror M is repeatedly carried out in the range 0<θ<90 degrees by the body 410 and the rod 420 performing vertical reciprocation. The tilting range of the mirror M can be controlled by adjusting the range of vertical movement of the rod 420.

In addition, the rotation of the mirror M can be carried out in the same fashion by the vertical rotary shaft 120 performing continuous rotation.

As set forth above, the invention can obtain spatial data by scanning information on a variety of angle ranges using a tilting structure of the mirror, which is not fixed to 45 degrees unlike the related art.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A three-dimensional space scanner comprising:
    a rotary drive unit transmitting a rotating force from a rotary motor through a vertical rotary shaft;
    a mirror holder rotated by the rotating force of the rotary drive unit, with a mirror provided on the mirror holder so as to tilt;
    a tilt guide unit having a central opening, through which the vertical rotary shaft passes through, and a spiral guide groove formed in an outer circumferential portion; and
    a tilt drive unit connected to the mirror via a rod and reciprocating along the guide groove in the outer circumferential portion of the tilt guide unit to tilt the mirror.

2. The three-dimensional space scanner of claim 1, wherein the rod is hinged to one end of the mirror, which tilts depending on a distance of vertical movement of the tilt drive unit.

3. The three-dimensional space scanner of claim 2, wherein a range of tilting of the mirror is determined depending on a range of vertical movement of the rod.

4. The three-dimensional space scanner of claim 1, wherein a range of tilting of the mirror is determined depending on a range of vertical movement of the rod.

5. The three-dimensional space scanner of claim 1, wherein the tilt drive unit includes:
    at least one body having a protrusion coupling with the guide groove to move along the guide groove; and
    the rod having one end connected to the body and the other end hinged to the mirror.

6. The three-dimensional space scanner of claim 5, wherein the body vertically moves along a path of the guide groove in the outer circumferential portion of the tilt guide unit while turning around the vertical rotary shaft.

7. The three-dimensional space scanner of claim 1, wherein the guide groove of the tilt guide unit comprises a single guide groove or a pair of crossing guide grooves, which are joined to each other at an axial end.

8. The three-dimensional space scanner of claim 1, further comprising a frame housing therein the tilt guide unit and the tilt drive unit to protect.

9. The three-dimensional space scanner of claim 8, wherein the frame maintains a predetermined interval from an outer circumference of the tilt guide unit such that the tilt drive unit provided between the frame and the tilt guide unit is supported by the frame to move along the outer circumference of the tilt guide unit.

* * * * *